Patented May 27, 1952

2,598,316

UNITED STATES PATENT OFFICE 2,598,316

INTERPOLYMERS OF A 2-ALKENYL 2-ALKENOATE, A 2-ALKENYL ALCOHOL, AND ANOTHER COPOLYMERIZABLE MONOOLEFINIC COMPOUND

Pliny O. Tawney, Passaic, N. J., assignor to United States Rubber Company, New York, N. Y., a corporation of New Jersey No Drawing. Application October 23, 1948, Serial No. 56,259

15 Claims. (Cl. 260—78.5)

My invention relates to a new class of soluble, unsaturated, ternary interpolymers of a 2-alkenyl 2-alkenoate, a 2-alkenyl alcohol, and a different copolymerizable monoolefinic compound of a certain class, which interpolymers can be converted to a solvent- and a heat-resistant state by further polymerization or copolymerization, as well as to a method of preparing these interpolymers.

The copolymers of 2-alkenyl 2-alkenoates such as allyl acrylate with various copolymerizable monoolefinic compounds such as methyl acrylate or diethyl fumarate are highly regarded by the art because of their optical clarity and resistance to discoloration upon aging, even at elevated temperatures. However, the preparation of such copolymers is attended by gelation of the reaction mixture before more than minor amounts of the monomeric starting materials have been converted to the copolymeric form. The resulting mixtures of insoluble gel, low molecular weight copolymers and unreacted monomers are not only difficult to manipulate but are actually of little or no commercial utility since many processes such as coating and molding require a uniform and initially soluble, fusible resin which, after application on shaping, can be subsequently "cured" or polymerized to a solvent and heat-resistant state. Soluble, unsaturated copolymers of 2-alkenyl 2-alkenoates and copolymerizable monoolefinic compounds can be obtained in very low yields by halting the copolymerizations before gelation occurs. However, the resulting copolymers must be submitted to extensive purification operations to remove the large amounts of unreacted starting materials, and the latter themselves must be isolated, purified and recycled for use in subsequent copolymerizations. The prior art has attempted to overcome the economic disadvantages of such a process by increasing the yield of soluble copolymer prior to gelation. However, the proposed methods, which include the use of high reaction temperatures, large amounts of diluents, catalysts, inhibitors, etc. actually effect only small or insignificant increases in the yield of soluble copolymer and introduce the additional disadvantage of requiring further purification to remove diluents, inhibitors, catalyst fragments, etc., in order that the desirable properties of the resulting resin be retained.

I have now discovered a method whereby the prior art difficulties are overcome, which comprises interpolymerizing a mixture of a 2-alkenyl 2-alkenoate and a copolymerizable monoolefinic compound of a certain class with a 2-alkenyl alcohol to form valuable new interpolymers. By my method the major proportion of both the 2-alkenyl 2-alkenoate and the copolymerizable monoolefinic compound can be converted to novel, soluble interpolymeric bodies without danger of gelation. Unlike the prior art, my reaction proceeds readily at moderate temperatures and requires no special precautions such as have heretofore been employed in attempts to avert or delay gelation.

The interpolymerizable 2-alkenyl alcohols which are useful in my invention are of the type formula $R^*CH=CR^*—CH_2—OH$ where one $R^*$ is hydrogen and the other $R^*$ is one of the radicals hydrogen, chlorine, methyl, ethyl and phenyl. Exemplary of such alcohols are allyl, methallyl, 2-chloroallyl, ethallyl, crotyl and cinnamyl alcohols, among which those containing a terminal methylene group, e. g., allyl alcohol, are preferred. I have found that the presence of as little as 0.2 mole of the interpolymerizable 2-alkenyl alcohol (per mole of the 2-alkenyl alkenoate) in the polymerizing reactant mixture is sufficient to secure a marked increase in the conversion of the 2-alkenyl alkenoate and the other copolymerizable monoolefinic compound to the soluble interpolymeric form. The major proportion of the latter compounds can be converted to soluble interpolymers when about 3–5 moles of a 2-alkenyl alcohol per mole of 2-alkenyl alkenoate are initially present, and even higher conversion can be obtained as the proportion of the alcohol is further increased, e. g., to 7–10 moles.

Suitable 2-alkenyl 2-alkenoates are those having the type formula

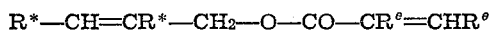

$$R^*—CH=CR^*—CH_2—O—CO—CR^\theta=CHR^\theta$$

wherein one $R^*$ and one $R^\theta$ are hydrogen while the other $R^*$ and $R^\theta$ are hydrogen, chlorine, methyl or phenyl. Illustrative of such compounds are allyl acrylate, allyl methacrylate, methallyl acrylate, allyl chloroacrylate, allyl crotonate, cinnamyl acrylate, allyl cinnamate and chloroallyl chloroacrylate. Those compounds in which the terminal $R^*$ and $R^\theta$ are hydrogen, as in allyl acrylate, are preferred since they are polymerize most readily and rapidly at moderate temperatures to yield soluble interpolymers capable of being readily cured to an insoluble, infusible state.

The copolymerizable monoolefinic compounds which are operable in my invention are the solely aliphatic monoolefinic compounds represented by the type formula $RR'C=CR''R'''$ wherein R is hydrogen, fluorine or methyl; R' is hydrogen, fluorine, carboxyl or a group hydrolyzable to carboxyl, including carbalkoxy (e. g., carbomethoxy, carboethoxy, carbohexoxy), carbamyl, N-alkylcarbamyl (e. g., N-methyl-carbamyl), and carbonitrilo; R'' is hydrogen, lower alkyl (e. g., methyl, ethyl), chlorine, fluorine, carboxyl or a group hydrolyzable to carboxyl as defined above; R''' is chlorine, fluorine, carboxyl, a group hydrolyzable to carboxyl, alkoxy (e. g., methoxy, ethoxy, propoxy, isopropoxy, butoxy, amyloxy, hexoxy, heptoxy, octoxy, nonoxy, decoxy), acyloxy devoid of olefinic and acetylenic unsaturation, i. e., alkanoyloxy (e. g., acetoxy, propionoxy, butyroxy), acyl devoid of olefinic and acetylenic unsaturation, i. e., alkanoyl, (e. g., acetyl, propionyl, isobutyryl); or, R''' may be carboxymethyl, when R'' is carboxyl or a group hydrolyzable thereto; or R''' may together with R' comprise a carbanhydro group —CO—O—CO—, or a carbimido group —CO—NR+—CO—, where R+ is hydrogen, or alkyl (e. g., methyl, ethyl, propyl, isopropyl, butyl, isobutyl, amyl, cyclopentyl, hexyl, cyclohexyl, heptyl, octyl, nonyl, decyl).

By the appropriate choice from the above class of copolymerizable monoolefinic compounds, numerous variations in the properties of the resulting soluble, unsaturated ternary interpolymers can be attained.

Thus, copolymerization with a halogenated monoolefinic compound such as vinyl chloride or vinylidene chloride as the third component yields polymeric materials of increased flame-resistance and often of greater hardness. Harder products can also be obtained by the copolymerization with olefinic acid nitriles, amides and imides, e. g., acrylonitrile or methacrylamide, as the third component. On the other hand, softer and more flexible products can usually be obtained by the copolymerization with, as the third component, one of the olefinic acid esters of nonenic monohydric alcohols, including the alkyl acrylates, methacrylates, maleates, fumarates, itaconates, mesaconates, and aconitates, particularly such esters derived from alcohols containing a chain of two or more carbon atoms, e. g., ethanol, n-butanol, 2-ethyl-1-hexanol and 1-octanol.

The non-hydrocarbon monoolefinic compounds used in the process of this invention result in products which can be used to produce molded articles or cured surface coatings having certain desirable properties, notably exceptional resistance to attack by hydrocarbon solvents.

Of the wide variety of such copolymerizable monoolefinic compounds which I may use in my invention, I especially prefer to employ the following because of the superior properties of the products, and because of the ease and convenience with which the copolymerization can be carried out, as well as for reasons of economy, etc.:

1. The acrylic esters of the saturated aliphatic monohydric alcohols, such as methyl acrylate, methyl methacrylate, butyl acrylate; butyl methacrylate, octyl acrylate; beta-chloroethyl acrylate, etc. Of these, the lower alkyl acrylates and methacrylates are most especially preferred.

2. The vinyl esters of the saturated aliphatic monocarboxylic acids, such as vinyl acetate, vinyl chloroacetate, vinyl trichloroacetate, vinyl propionate, vinyl butyrate, etc.

3. The vinyl alkyl ethers such as vinyl n-butyl ether, vinyl hexyl ether, etc.

4. The esters of alpha-olefinic polycarboxylic acids with saturated aliphatic monohydric alcohols, such as diethyl fumarate, bis (beta-chloroethyl) fumarate, dibutyl fumarate, bis (2-ethylhexyl) fumarate, dimethyl itaconate, diethyl itaconate, dihexyl itaconate, dicyclohexyl itaconate, dioctyl itaconate, bis(-beta-chloroethyl) itaconate, etc., as well as the corresponding esters of mesaconic, citraconic and aconitic acids. Of these, the lower alkyl fumaric and itaconic esters are most especially preferred.

Further examples of preferred monoolefinic compounds are acrylamide, N-methylacrylamide, acrylonitrile, methacrylonitrile, fumaronitrile, maleimide, N-butyl maleimide, vinyl chloride, vinylidene chloride, methyl vinyl ketone, etc.

In carrying out my invention, the 2-alkenyl 2-alkenoate is heated, e. g., at 60–120° C., with from 0.1 to 8.0, preferably from 0.5 to 6.0, and particularly from 0.5 to about 4.0 molar equivalents of the copolymerizable aliphatic, non-hydrocarbon monoolefinic compound or mixture of such compounds and with from 0.2 to 12, preferably 0.2–9.0, molar equivalents of a 2-alkenyl alcohol.

The reaction time will vary to some extent, depending upon the interpolymerizable reactants employed and upon the relative proportions thereof; times in the range of from 1 to 100 hours are usually sufficient, although longer times, e. g., 200–300 hours, may be employed where very high yields of the soluble interpolymers are desired. My interpolymerization reaction is promoted by free radicals, including those obtained by the thermal decomposition of peroxides, e. g., organic peroxides such as acetyl peroxide, benzoyl peroxide, tertiary-butyl hydrogen peroxide. Such promoters are generally employed in amounts of from 0.1 to 10%, usually from 0.1–5%, by weight of the reactant mixture, and may be added either at the beginning, or incrementally throughout the course of the reaction. The course of the reaction can be followed by observing the increase in viscosity of the reaction mixture, and the product can be isolated therefrom by removal of unreacted starting materials by preferential extraction, evaporation or distillation. Although it is unnecessary for most commercial applications, the interpolymers can be further purified, if necessary, e. g., for analytical purposes, by solution in a minimum volume of a solvent such as acetone and precipitation by dilution with n-hexane.

The soluble interpolymeric products thus obtained are capable of being cured to a solvent- and heat-resistant state by virtue of their residual unsaturation, as indicated by their iodine values of from about 50 to 225. The amount of this residual unsaturation in my interpolymers varies with the monomeric reactants employed and, more significantly, with the relative proportions thereof within the concentration ranges previously cited. For most applications I have found that my interpolymers having iodine values of from about 80 to about 180 are completely satisfactory. An especially preferred class of products having an iodine number of about 80 to 180 are those devised from the acrylic esters of the saturated aliphatic monohydric alcohols, as set forth previously. These products may be molded, cast, etc. to form objects of good optical clarity and resistance to discoloration upon aging.

My new interpolymers can be employed as thermosetting molding powders and in such applications they can be readily formed into various shapes, e. g., rods and sheets, which are notable for their high degree of optical transparency and freedom from brittleness. My interpolymers can likewise be employed, in the presence of diluents, for coating, impregnating repeatedly through a 180° angle with no evidence of chipping, flaking or separation of the coating.

Similar films of high bonding strength to metal are obtained when n-butyl acid maleate is substituted for maleic anhydride in the above coating composition.

(c) Fourteen parts of the interpolymer are dissolved in 6 parts of allyl acrylate together with 0.4 part of benzoyl peroxide. The solution is flowed into a shallow ferro-chrome mold (2½" x 2½" x ⅛") in which it is heated for 15 hours at 50° C. and then for one hour at 100° C. The resulting sheet is clear, water-white, and inert to organic solvents. In polarized light it reveals a low order of strain. It possesses a Barcol hardness of 47, and Rockwell hardnesses of M99 and P82.

EXAMPLE 3

A solution comprising 112.2 parts of allyl acrylate, 19.2 parts of n-butyl acrylate and 525.6 parts of methallyl alcohol is heated with 4.01 parts of benzoyl peroxide for 24 hours at 113° C. The excess methallyl alcohol is then removed by distillation under reduced pressure and the interpolymer is purified by repeated solution in acetone and precipitation with n-hexane. After drying in vacuo, 151 parts of polymeric solid are obtained. Iodine number 102.1; $[\eta]°$ 0.084.

Seven parts of the above ternary interpolymer are dissolved in 3 parts of allyl acrylate together with 0.2 part of benzoyl peroxide to yield a clear mobile solution which is poured into a 2½" x 2½" x ⅛" mold and polymerized by heating for 15 hours at 50° C., and then for 1 hour at 100° C. The resultant sheet is clear, colorless, and insoluble in organic solvents. It has a Barcol hardness of 43.

EXAMPLE 4

A mixture of 56.1 parts of allyl acrylate, 64.1 parts of n-butyl acrylate, 480.8 parts of methallyl alcohol and 3.72 parts of benzoyl peroxide is heated for 24 hours at 112° C. After isolating and purifying the interpolymer as in Example 2, 95.3 parts of solid product were obtained. Iodine number 82.8; $[\eta]°$ 0.74.

Four parts of the interpolymer are dissolved in a mixture of 7 parts of acetone, 2.4 parts of xylene, 0.4 part of cyclohexanone and 0.2 part of 2-ethylhexanol-1. The solution was flowed onto a glass panel and baked for 20 minutes at 200° C. to yield a tack-free film which is colorless, mar-resistant and insoluble in organic solvents.

EXAMPLE 5

Fifty-six and one tenth parts of allyl acrylate and 86.1 parts of methyl acrylate are dissolved in 568.8 parts of methallyl alcohol together with 2.275 parts of benzoyl peroxide. The resulting solution is heated for 24 hours at 107° C. and the product is isolated and purified as in previous examples to yield 133 parts of solid interpolymer. Iodine number 89.1; $[\eta]°$ 0.078. A solution of 5 parts of the interpolymer in 5 parts of cyclohexanone has a viscosity of 25 poises at 25° C.

A solution of 8 parts of the interpolymer dissolved in a mixture of 14 parts of acetone, 4.8 parts of xylene, 0.8 part of cyclohexanone and 0.4 part of 2-ethylhexanol-1 is flowed onto a glass panel and baked for 20 minutes at 200° C. The resulting smooth, adherent film has good mar resistance and is not attacked by organic solvents.

EXAMPLE 6

A mixture of 56.1 parts of allyl acrylate, 64.1 parts of n-butyl acrylate and 360.6 parts of methallyl alcohol is heated with 2.91 parts of benzoyl peroxide for 6 hours at 114° C. Ninety-seven parts of pure interpolymer are obtained as the reaction product. Iodine number 79.5; $[\eta]°$ 0.10.

Eight parts of the interpolymer are dissolved in a mixture of 15.8 parts of xylene, 4.0 parts of n-butanol and 0.2 part of carbitol acetate. The solution is divided and poured onto two glass plates which are baked at 200° C. for 20 minutes and 60 minutes respectively. Both films are hard, glossy and inert to organic solvents. The film baked for 60 minutes is as clear, colorless and adherent as the film baked for only 20 minutes; hence the additional heating has had no deleterious effect.

EXAMPLE 7

An interpolymer obtained in the amount of 49.1 parts by heating a mixture of 33.6 parts of allyl acrylate, 3.85 parts of n-butyl acrylate, 149.6 parts of methallyl alcohol and 1.16 parts of benzoyl peroxide for 20.5 hours at 111° C., is treated in the same manner as the interpolymer of Example 5, but yields a film which is somewhat less flexible due to the smaller amount of n-butyl acrylate in the interpolymer.

EXAMPLE 8

By heating a solution of 44.9 parts of allyl acrylate, 51.3 parts of n-butyl acrylate and 2.33 parts of benzoyl peroxide in 288.6 parts of methallyl alcohol for 2 hours at 111° C., 102 parts of interpolymer are obtained which yields films comparable to those of Example 5, particularly with respect to their toughness and flexibility.

EXAMPLE 9

A solution of 56.1 parts of allyl acrylate, 15.0 parts of methyl methacrylate and 2.68 parts of benzoyl peroxide dissolved in 284.4 parts of allyl alcohol is heated for 24.2 hours at 96° C. After isolating and purifying the reaction product in the usual fashion, 63.3 parts of interpolymer are obtained. Iodine number 118.2; $[\eta]°$ 0.09.

Four parts of the interpolymer are dissolved in a mixture of 3 parts of xylene, 2.5 parts of cyclohexanone and 0.5 part of carbitol acetate. The solution is flowed onto a glass panel and baked at 200° C. for 20 minutes. The film thus formed is clear, colorless, smooth, glossy and indifferent to the action of organic solvents. When scraped with a sharp knife the film separates from the glass in continuous flexible ribbons.

EXAMPLE 10

Thirty-three and four-tenths parts of allyl methacrylate and 10.2 parts of isobutyl acrylate are dissolved in 174.4 parts of allyl alcohol together with 1.97 parts of benzoyl peroxide and the resulting solution is heated for 24 hours at 97° C. Forty-two and five-tenths parts of interpolymer are isolated from the reaction mixture by the method of previous examples. Iodine number 120.2.

A solution of 5 parts of the interpolymer dissolved in 5 parts of cyclohexanone has a viscosity of 10.5 poises at 25° C.

Four parts of the interpolymer are dissolved in a mixture of 7.0 parts of acetone, 2.4 parts of xylene, 0.4 part of cyclohexanone and 0.2 part of and laminating operations, and for such purposes, the crude interpolymerization reaction mixtures can themselves be used if they are first diluted with a suitable high boiling solvent, e. g., xylene, and subsequently heated to remove any unreacted 2-alkenyl alcohol. In such applications, my interpolymers yield clear, flexible films whose lack of color renders them particularly suitable for dyeing and pigmentation.

My interpolymers can likewise be dissolved in liquid copolymerizable ethylenic compounds, e. g., tolyl acrylate, diethyl fumarate, styrene, or vinyl butyrate, to yield solutions which are capable of being totally polymerized, leaving no solvent to be evaporated. Such solutions are particularly useful where the removal of a solvent from a coating or impregnating composition would constitute a technical hazard. They are likewise useful as initially fluid molding compositions which can be cured with a minimum of shrinkage.

Upon heating, e. g., at 60-200° C., compositions containing my interpolymers, particularly in the presence of added catalyst, further polymerization is induced and the resulting products display dimensional stability even at elevated temperatures as well as a high degree of resistance to attack by solvents. Suitable inert addends including dyes, pigments, fillers and plasticizers can be incorporated with my interpolymers preferably at the soluble, fusible stage prior to final cure.

The following examples disclose my invention in detail. All parts are by weight.

EXAMPLE 1

Various mixtures of a 2-alkenyl 2-alkenoate, a 2-alkenyl alcohol and another copolymerizable monoolefinic compound are heated at 60° C. in the presence of benzoyl peroxide as a promoter until in each case the point of incipient gelation is attained. The reaction mixture is then diluted with n-hexane and the precipitated interpolymer is further purified by solution in a minimum volume of acetone and reprecipitation with n-hexane. The products are finally dried in vacuo to constant weight.

In Table I below are summarized the amounts of the starting materials, the peroxide and the polymeric products as well as the reaction times.

To emphasize the advantages of my invention examples of the prior art copolymerization of 2-alkenyl 2-alkenoates and copolymerizable monoolefinic compounds in the absence of 2-alkenyl alcohols are included (I-1, 5, 8, 10, 12, 13, 14, 15).

From Table I above it is readily apparent that the presence of even small amounts of an interpolymerizable 2-alkenyl alcohol effects a significant increase in the amounts of the 2-alkenyl 2-alkenoate and the copolymerizable monoolefinic compound converted to the soluble copolymeric form, and that this conversion can be increased to a marked extent by increasing the amount of the 2-alkenyl alcohol in the reactant mixture. The vastly superior effectiveness of my interpolymerizable 2-alkenyl alcohols in comparison with the non-polymerizable solvents employed in the art is likewise noteworthy.

EXAMPLE 2

A mixture of 112.2 parts of allyl acrylate, 38.5 parts of n-butyl acrylate and 452 parts of methallyl alcohol is heated together with 3.67 parts of benzoyl peroxide for 24.5 hours at 115° C. The reaction mixture is then cooled and, after the addition of a trace of hydroquinone to repress further polymerization, the unreacted methallyl alcohol is removed by distillation under diminished pressure. The polymeric residue is purified by repeatedly dissolving it in acetone and precipitating it with n-hexane. A final precipitation is carried out by adding methanol to an acetone solution of the interpolymer and the product is then dried in vacuo to constant weight, yielding 138 parts of polymeric solid. Iodine number (Wijs) 98.6; $[\eta]°$ (intrinsic viscosity in acetone) 0.095.

The iodine number indicates the large amount of unsaturation in the interpolymer which is available for further polymerization.

(a) A solution of 5 parts of the interpolymer dissolved in a mixture of 4 parts of acetone, 0.5 part of cyclohexanone and 0.5 part of toluene is poured onto a glass panel and baked for 20 minutes at 200° C. The resultant film is smooth, glossy, mar-resistant, and is tack-free even when hot. It is not discolored during the cure and is inert to the action of organic solvents.

(b) Seventeen and four-tenth parts of the interpolymer together with 0.087 part of maleic anhydride are dissolved in a mixture of 17.5 parts of xylene, 17.5 parts of acetone, 20.7 parts of methyl ethyl ketone, 2 parts of cyclohexanone and 0.5 part of 2-ethylhexanol-1. The resulting solution is flowed onto a metal plate and baked at 200° C. for 20 minutes. The resulting film is smooth, glossy, colorless, mar-resistant and unaffected by organic solvents. The adherence of the film to metal is excellent, and the coated plates can be hammered, twisted, bent or flexed Table I

| | Alkenyl Alkenoate | | Copolymerizable Monomer | | 2-Alkenyl Alcohol or Diluent | | Benzoyl Peroxide | Reaction Time (Hrs.) | Polymeric Product |
|---|---|---|---|---|---|---|---|---|---|
| 1 | Allyl Acrylate | 100 | Diethyl Fumarate | 50 | | | 0.00 | 5.75 | 7.65 |
| 2 | do | 100 | do | 50 | Allyl Alcohol | 20 | 0.8 | 1.9 | 14.7 |
| 3 | do | 100 | do | 50 | do | 50 | 1.0 | 1.7 | 26.3 |
| 4 | do | 100 | do | 50 | do | 100 | 1.2 | 2.0 | 44.0 |
| 5 | do | 100 | do | 50 | (Benzyl Alcohol) | 100 | 1.6 | 1.5 | 18.6 |
| 6 | do | 100 | do | 50 | Allyl Alcohol | 200 | 1.7 | 4.5 | 74.6 |
| 7 | do | 100 | do | 50 | do | 400 | 5.0 | 11.75 | 158.0 |
| 8 | do | 100 | Diethyl Maleate | 50 | | | 0.5 | 1.7 | 4.05 |
| 9 | do | 100 | do | 50 | Methallyl Alcohol | 100 | 1.0 | 2.9 | 27.6 |
| 10 | do | 100 | Dimethyl Itaconate | 20 | | | 0.0 | 26.0 | 4.1 |
| 11 | do | 100 | do | 20 | Allyl Alcohol | 100 | 0.8 | 1.9 | 41.0 |
| 12 | do | 100 | do | 20 | (Benzyl Alcohol) | 100 | 0.8 | 5.9 | 10.3 |
| 13 | do | 100 | do | 20 | (Carbon Tetra-Chloride) | 100 | 0.8 | 5.9 | 3.48 |
| 14 | do | 100 | do | 20 | (Benzene) | 100 | 0.8 | 3.9 | 14.5 |
| 15 | do | 100 | Butyl Vinyl Ether | 200 | | | 1.5 | 0.2 | 9.6 |
| 16 | do | 100 | do | 200 | Allyl Alcohol | 400 | 4.2 | ¹ 240.0 | 142.0 |

¹ No evidence of incipient gelation.

2-ethylhexanol-1, and the solution is flowed onto a glass panel. After baking for 20 minutes at 200° C. a smooth, glossy, adherent film is formed which displays good mar resistance and is not attacked by organic solvents.

Having thus described my invention, what I claim and desire to protect by Letters Patent is:

1. A soluble, ethylenically unsaturated, ternary interpolymer of monomers consisting of (A) a 2-alkenyl 2-alkenoate, (B) a copolymerizable monoolefinic compound selected from the group consisting of acrylic esters of the saturated aliphatic monohydric alcohols, vinyl esters of the saturated aliphatic monocarboxylic acids, vinyl alkyl ethers, vinyl methyl ketone, esters of alpha-olefinic polycarboxylic acids with saturated aliphatic monohydric alcohols, acrylamide, N-methylacrylamide, acrylonitrile, methacrylonitrile, fumaronitrile, maleimide, N-butyl maleimide, vinyl chloride, and vinylidene chloride and (C) a 2-alkenyl alcohol, the said interpolymer being derived from an interpolymerizable mix containing from 0.2 to 12 molar equivalents of (C) and from 0.1 to 8.0 molar equivalents of (B) per molar equivalent of (A).

2. A soluble ethylenically unsaturated ternary interpolymer as in claim 1 having a Wijs iodine number from 80 to 180.

3. A soluble ethylenically unsaturated ternary interpolymer as in claim 1 in which the 2-alkenyl alcohol (C) is allyl alcohol.

4. A soluble ethylenically unsaturated ternary interpolymer as in claim 1 in which the copolymerizable monoolefinic compound (B) is an acrylic ester of a saturated aliphatic monohydric alcohol.

5. A soluble ethylenically unsaturated ternary interpolymer as in claim 1 having a Wijs iodine number of from 80 to 180, in which the copolymerizable monoolefinic compound (B) is an acrylic ester of a saturated aliphatic monohydric alcohol.

6. A soluble ethylenically unsaturated ternary interpolymer as in claim 1 in which the copolymerizable monoolefinic compound (B) is a vinyl ester of a saturated aliphatic monocarboxylic acid.

7. A soluble ethylenically unsaturated ternary interpolymer as in claim 1 in which the copolymerizable monoolefinic compound (B) is an alpha-olefinic polycarboxylic acid ester of a saturated aliphatic monohydric alcohol.

8. A soluble ethylenically unsaturated ternary interpolymer as in claim 1 in which the 2-alkenyl alkenoate (A) is allyl acrylate.

9. The method of preparing a soluble ethylenically unsaturated interpolymer of (A) a 2-alkenyl 2-alkenoate, (B) a copolymerizable monoolefinic compound selected from the group consisting of acrylic esters of the saturated aliphatic monohydric alcohols, vinyl esters of the saturated aliphatic monocarboxylic acids, vinyl alkyl ethers, vinyl methyl ketone, esters of alpha-olefinic polycarboxylic acids with saturated aliphatic monohydric alcohols, acrylamide, N-methylacrylamide, acrylonitrile, methacrylonitrile, fumaronitrile, maleimide, N-butyl maleimide, vinyl chloride and vinylidene chloride, which comprises carrying out the interpolymerization in the presence of (C) a 2-alkenyl alcohol, from 0.2 to 12 molar equivalents of (C) and from 0.1 to 8.0 molar equivalents of (B) being present per molar equivalent of (A).

10. The method as in claim 9 in which the 2-alkenyl alcohol (C) is allyl alcohol.

11. The method as in claim 9 in which the copolymerizable monoolefinic compound (B) is an acrylic ester of a non-olefinic aliphatic monohydric alcohol.

12. The method as in claim 9 in which the copolymerizable monoolefinic compound (B) is a vinyl ester of a non-olefinic aliphatic monocarboxylic acid.

13. A soluble ethylenically unsaturated tenary interpolymer of monomers consisting of allyl acrylate, a lower alkyl acrylate and allyl alcohol having a Wijs iodine number of about 80 to 180 the said interpolymer being derived from an interpolymerizable mix containing from 0.2 to 12 molar equivalents of allyl alcohol and from 0.1 to 8.0 molar equivalents of lower alkyl acrylate per molar equivalent of allyl acrylate.

14. A soluble ethylenically unsaturated ternary interpolymer of monomers consisting of allyl acrylate, diethyl fumarate and allyl alcohol the said interpolymer being derived from an interpolymerizable mix containing from 0.2 to 12 molar equivalents of allyl alcohol and from 0.1 to 8.0 molar equivalents of diethyl fumarate per molar equivalent of allyl acrylate.

15. A soluble ethylenically unsaturated ternary interpolymer of monomers consisting of allyl acrylate, vinyl acetate and allyl alcohol the said interpolymer being derived from a polymerizable mix containing from 0.2 to 12 molar equivalents of allyl alcohol and from 0.1 to 8.0 molar equivalents of vinyl acetate per molar equivalent of allyl acrylate.

PLINY O. TAWNEY.

REFERENCES CITED

The following references are of record in the file of this patent:

UNITED STATES PATENTS

| Number | Name | Date |
| --- | --- | --- |
| 2,295,923 | Barnes | Sept. 15, 1942 |
| 2,332,896 | D'Alelio | Oct. 26, 1943 |
| 2,441,515 | Snyder | May 11, 1948 |
| 2,441,516 | Snyder | May 11, 1948 |